United States Patent
Benedetti et al.

(10) Patent No.: US 9,420,205 B2
(45) Date of Patent: Aug. 16, 2016

(54) IMAGE ACQUISITION METHOD OF OBJECT ON SUPPORTING SURFACE

(71) Applicant: DATALOGIC IP TECH S.R.L., Lippo di Calderara di Reno (IT)

(72) Inventors: Michele Benedetti, Calderara di Reno (IT); Roberto Musiani, Monte San Pietro (IT)

(73) Assignee: DATALOGIC IP TECH S.R.L., Calderara di Reno (Bologna) (IT)

( * ) Notice: Subject to any disclaimer, the term of this patent is extended or adjusted under 35 U.S.C. 154(b) by 18 days.

(21) Appl. No.: 14/355,891

(22) PCT Filed: Oct. 31, 2012

(86) PCT No.: PCT/IB2012/056065
§ 371 (c)(1),
(2) Date: May 2, 2014

(87) PCT Pub. No.: WO2013/065003
PCT Pub. Date: May 10, 2013

(65) Prior Publication Data
US 2014/0285690 A1    Sep. 25, 2014

(30) Foreign Application Priority Data

Nov. 4, 2011 (IT) .............................. MO2011A0278
Nov. 4, 2011 (IT) .............................. MO2011A0279
Nov. 4, 2011 (IT) .............................. MO2011A0280

(51) Int. Cl.
H04N 5/357    (2011.01)
G06K 7/14    (2006.01)
G06T 3/00    (2006.01)

(52) U.S. Cl.
CPC .............. *H04N 5/357* (2013.01); *G06K 7/1439* (2013.01); *G06K 7/1456* (2013.01); *G06T 3/00* (2013.01)

(58) Field of Classification Search
None
See application file for complete search history.

(56) References Cited

U.S. PATENT DOCUMENTS

| | | | |
|---|---|---|---|
| 2003/0228039 A1 | 12/2003 | Green | |
| 2005/0207671 A1 | 9/2005 | Saito | |
| 2007/0081695 A1 | 4/2007 | Foxlin et al. | |
| 2009/0090781 A1* | 4/2009 | Ye | G06T 3/00 235/462.09 |
| 2009/0231458 A1* | 9/2009 | Moriyama | G06K 9/00228 348/222.1 |
| 2011/0149094 A1 | 6/2011 | Chen | |

FOREIGN PATENT DOCUMENTS

| | | |
|---|---|---|
| GB | 2371738 A | 8/2002 |
| WO | WO03024090 A1 | 3/2003 |
| WO | WO2011046710 A1 | 4/2011 |

OTHER PUBLICATIONS

International Search Report dated Mar. 22, 2013 from corresponding PCT Application No. PCT/IB2012/056065, 2 pages.

* cited by examiner

*Primary Examiner* — Albert Cutler
(74) *Attorney, Agent, or Firm* — Duane Morris LLP

(57) ABSTRACT

A method of acquiring images of an object arranged on a supporting surface includes providing at least one optical image acquisition apparatus of the object provided with an optical axis; in a work step of the optical apparatus an acquired image is processed to correct a possible perspective distortion of the image and at least one feature of the object is extracted from the processed image. The method further includes associating a known reference plane with the object and, in a configuration step of the optical apparatus preceding the work step, obtaining a corresponding inclination between the reference plane and the optical axis; processing the acquired image in fact comprises identifying a processing mode determined as a function of the corresponding inclination and applying this preset processing mode to correct the possible perspective distortion.

18 Claims, 3 Drawing Sheets

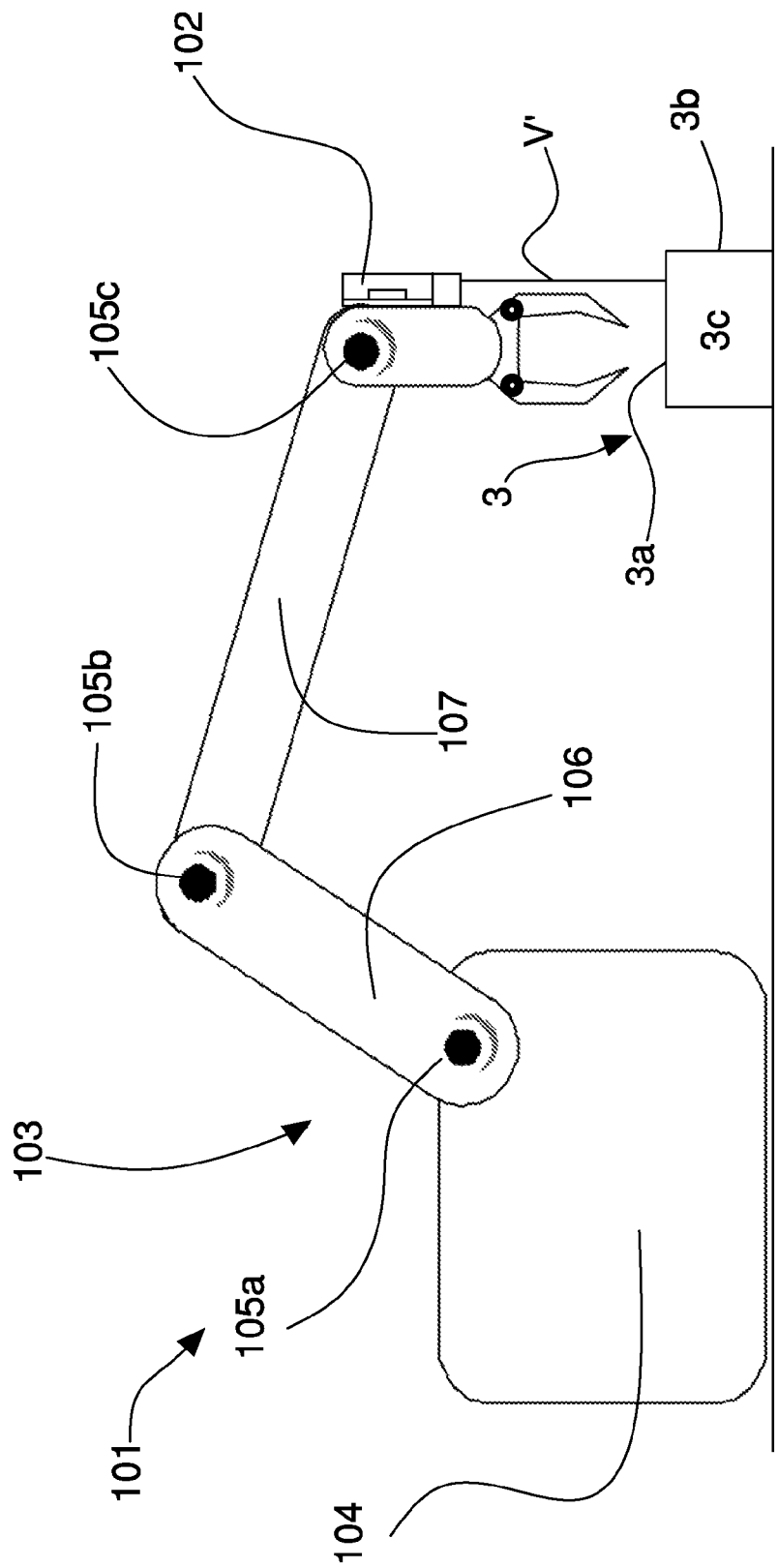

IMAGE ACQUISITION METHOD OF OBJECT ON SUPPORTING SURFACE

BACKGROUND OF THE INVENTION

The invention relates to a method of acquiring images of an object implemented by an image acquisition system comprising at least one optical apparatus, that is able to process an acquired image for extracting at least one feature from said object.

In particular, the invention relates to acquisition systems comprising optical apparatuses that are able to acquire images of objects that are stationary and/or in transit on movable conveying means.

The invention further relates also to acquisition systems comprising movable optical apparatuses, i.e. apparatuses connected to a supporting base that is movable over time by successive movements between a plurality of different positions, that is able to acquire images of stationary objects. The optical apparatus in particular continuously changes orientation in space to acquire images of the object.

In the present description and in the subsequent claims the expression "optical apparatus for acquiring images" denotes an apparatus that is able to acquire images of an object arranged in a supporting surface, and in particular to acquire geometrical and/or shape features of said object, or optical information associated with said object.

The expression "optical information" denotes any graphic representation that constitutes information, whether coded or uncoded.

One example of coded information is a linear or two-dimensional optical code in which the data are coded that identify the object with which the optical code is associated. The information is coded by suitable combinations of elements of a preset shape, for example squares, rectangles or hexagons, of a dark (normally black) colour separated by light elements (normally white spaces), and barcodes, stacked codes and two-dimensional codes in general, colour codes, etc are known.

The term "optical information" further comprises, more in general, also other graphic shapes that include printed or handwritten characters (letters, numbers, etc) and particular shapes (so-called "patterns"), such as, for example, stamps, logos, signatures, finger prints, etc and any detectable graphic representation, not only in the field of visible light but also along the entire wave length comprised between infrared and ultraviolet.

In the prior art, in image acquisition systems, so-called "unattended scanning systems" are known that comprise digital cameras for acquiring the images of packages or objects in general that are stationary and/or in transit on a conveyor belt or on other supporting and/or handling and conveying means, and decoding by digital cameras the optical information printed or imposed thereupon. Such digital cameras, which comprise photosensors, can comprise one-dimensional or two-dimensional arrays of photosensors.

The expression "image processing" denotes the execution of an initial two-dimensional analysis of the acquired image in order to be able to process the image in greater detail subsequently.

This subsequent processing has the aim of "correctly extracting features of interest of the object". In other words, this last expression denotes an image recognition algorithm that enables the optical information to be read and decoded correctly, however oriented, associated with the object and/or outlines or characters associated with the object to be identified.

Known image acquisition systems typically comprise an optical apparatus, at least one lighting device associated with this apparatus, a user interface graphic device for configuring the acquisition system and a control device for managing the lighting device and the optical apparatus itself.

One typical problem of such acquisition systems lies in the fact that because of the corresponding positioning between the object and the optical apparatus, the images of the object acquired by the optical apparatus are often perspectively distorted. It is in fact not always possible or advisable to arrange the optical axis of the apparatus opposite the object to be inspected, orthogonally to the face of the object on which the coded information is positioned, or more in general, of which it is necessary to acquire an image. If the lighting device is incorporated into and surrounds the optical apparatus, it is, for example, necessary to incline the surface to be analysed, to avoid direct reflections on the optical apparatus.

In the case of image acquisition systems with a fixed optical apparatus, the lack of space or points suitable for fixing to the resting base, constrains the positioning of the optical apparatus in relation to the object to be acquired in such a manner that this positioning is often not optimal from the point of view of the acquired image, which can be perspectively distorted.

On the other hand, in the case of image acquisition systems with a movable optical apparatus, for example mounted on a robot arm for "pick and place" applications, the optical apparatus continuously changes orientation in space, moving integrally with the robot arm. In these systems, the arrangement of the optical apparatus with respect to the object is determined not by the needs for optimum acquisition of images but by the needs of the robot arm. The acquired images can thus be perspectively distorted.

The perspective distortion of the object in the acquired image makes the image recognition and decoding algorithms much more complex and less efficient, with consequently lengthy processing times for decoding the image. Further, the distortion of the image can introduce decoding errors, owing to an incorrect interpretation of the optical information in the image.

For example, a graphic sign reproducing a character in a text could be interpreted incorrectly by an optical character recognition (OCR) algorithm. Similarly, a decoding error could take place if a first characteristic has to be extracted from an image positioned in a first region of interest that is identifiable by geometric parameters starting from a second region of interest. An alteration of this geometrical parameters for example the distance and/or the orientation between the first and/or the second region of interest due to the perspective distortion, could cause errors during the decoding step, as the first region of interest could be identified in a region in which the feature to be decoded is absent.

In order to overcome this problem, it is known to perform an image-processing step geometrically transforming the acquired image by an algorithm that is able to return the image to the actual non distorted proportions thereof, such as to extract features of interest of the object of the image transformed and not transformed by the acquired image.

This geometrical transformation provides for, for example, the use of algorithms based on the hypothesis that each point of the distorted image can be referred to a corresponding point of the actual image. A geometrical transformation algorithm needs the coordinates of certain suitably chosen points identified in the distorted image and in the transformed image to be able to be defined. Thus, an intervention by an operator is necessary during an optical apparatus configuration step so that the optical apparatus is able to define the geometrical transformation algorithm. The operator has in fact images at his disposal in which optical calibration images (also known as test patterns) are coded and by means of multiple acquisitions of such images provided with test patterns the geometrical transformation algorithm is defined.

This algorithm, identified in this configuration step of the optical apparatus, is subsequently used in a work step to process an image, which can be acquired subsequently, simultaneously, or also prior to this configuration step, transforming the image into a different image, before extracting the features of the object and thus decoding the image.

The image acquisition system thus requires the work step to be preceded by a configuration step of the optical apparatus during which the multiple acquisition of test patterns takes place and/or, for example, other operating parameters are set for the operation of the image acquisition system by means of the user interface graphic device (for example, it is also known to use the test patterns to determine the factor for converting pixels into mm).

This configuration procedure is laborious for the operator because of the multiple acquisitions of test patterns and further requires a not inconsiderable time in which the image acquisition system cannot be used automatically because it is in the configuration step.

This configuration time becomes critical if, in the case of a movable optical apparatus, it is necessary to identify all the possible work positions of the apparatus itself and, for each, define a corresponding geometrical transformation. In each possible work position, the multiple acquisitions of test patterns have to be repeated by test pattern and the configuration step is accordingly even more complex and longer.

Further, for a correct definition of the geometrical transformation algorithm and thus in order to effectively resolve perspective distortion, it is necessary for the correlation between the optical patterns, to be identified with great accuracy. This is all the more necessary the more the image is distorted perspectively.

In the presence of only a few test patterns the geometrical transformation is defined correctly only if the optical information is on an object having a planar surface, such as, for example, a label arranged on a face of a box-shaped body. In this specific case and in particular limit conditions, just one test pattern may be sufficient to define the geometrical transformation.

Nevertheless, defining this geometrical transformation becomes even longer to perform and difficult to solve if the object has a curved external surface. In fact, in the case of objects with curved or even irregular external surfaces not only are multiple acquisitions of calibration images with test pattern necessary but it is also necessary that such images are acquired from several positions in space. The first calibration image acquired is used to identify the calibration image on a reference surface, and subsequent test patterns on the other hand, are acquired by different spatial positions inside a work volume of interest and only then by the comparison between the calibration images of the test patterns acquired subsequently, that are possibly deformed perspectively during acquisition, with the test pattern of the first calibration image acquired it is thus possible to define the geometrical transformation. The time necessary for the operator to configure the optical apparatus and accordingly the image acquisition system increases even further.

BRIEF SUMMARY OF THE INVENTION

One object of the invention is to overcome the drawbacks of the methods for acquiring images of known type.

Another object is to provide a method of acquiring images that enables images to be acquired and which corrects possible perspective distortion by a geometrical transformation of the acquired image, but which simplifies the definition and identification of the geometrical transformation itself.

A further object is to provide a method of acquiring images that enables images to be acquired and which corrects possible perspective distortion by a geometrical transformation of the acquired image, and which ensures a geometrical transformation of great precision without requiring lengthy configuration.

Still another object is to provide a method of acquiring images that enables images to be acquired and corrects the possible perspective distortion by a geometrical transformation of the acquired image that does not require any intervention by an operator in a configuration step.

BRIEF DESCRIPTION OF THE SEVERAL DRAWINGS

These objects and still others are all achieved by a method of acquiring images as defined according to one or more of the claims set out below.

The invention can be better understood and implemented with reference to the attached drawings that illustrate an embodiment thereof by way of non-limiting example, in which:

FIG. 3 is a schematic view of a further embodiment of the image acquisition system, that uses a method of acquiring images according to the invention, provided with an optical apparatus connected to a movable supporting base that is integral therewith.

DETAILED DEXSCRIPTION OF THE INVENTION

Figure 1:
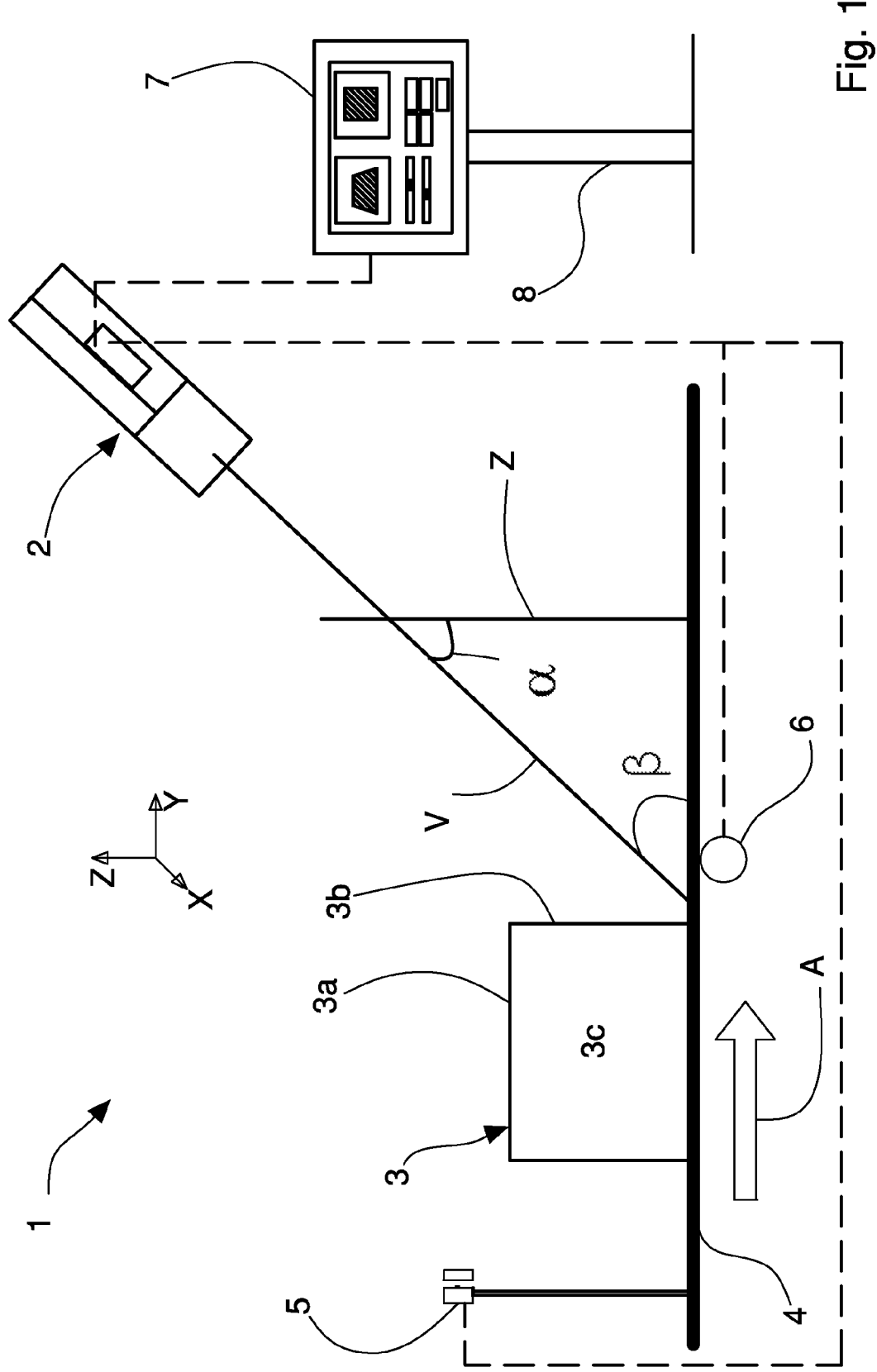
FIG. 1 is a schematic view of an image acquisition system 1 that uses a method of acquiring images according to the invention, provided with an optical apparatus 2 connected to a fixed supporting base.

With reference to FIG. 1, an image acquisition system 1 is shown schematically that is provided with at least one optical apparatus 2, for example a digital camera comprising one-dimensional or two-dimensional arrays of photosensors, in particular of the CCD or C-MOS type. Said optical apparatus 2 is able to acquire images of objects 3 that are stationary and/or in transit that are arranged above a movable supporting surface 4, which is illustrated schematically. One example of movable supporting surface is given by a conveyor belt. Such objects 3 advance along an advancement direction A indicated in FIG. 1 with an arrow. In FIG. 1 a single object 3 with a box-shaped body is shown, nevertheless, on the movable supporting surface 4 a plurality of objects 3 can advance in succession along the advancement direction A, which can have any shape.

The optical apparatus 2 of FIG. 1 is fixed in the sense that it is connected to a support base, which is not illustrated, which remains in the same position over time. The optical apparatus 2 is further arranged inclined, in such a manner that the optical axis V thereof, which is assumed to coincide with the longitudinal axis of the camera in such a manner that the inclination of the optical axis V and the inclination of the optical apparatus 2 coincide, is able to read a piece of coded information, for example a barcode, impressed or applied to a face of the object 3.

The object 3 has an upper face 3a, a frontal face 3b facing the optical apparatus 2 and a side face 3c.

It is noted that in FIG. 1 the optical apparatus 2 is shown inclined with respect to a vertical axis Z of a Cartesian reference system but not with respect to the remaining axes X and Y. The inclination of the optical axis is in this case given only by the angle α between the optical axis V of the optical apparatus 2 and the axis Z. Nevertheless, in a non-represented manner, the optical apparatus 2 can also present a non-nil inclination along the axes X and Y.

The movable supporting surface 4 of the objects 3 is illustrated in FIG. 1 as arranged horizontally. It remains understood that this supporting surface can also be arranged inclined, for example to move objects from bottom to top, transferring such objects to a position along the greater Z axis.

The image acquisition system 1 further comprises a non-illustrated control device, for example a microprocessor integrated into the optical apparatus 2, for managing acquisition of images of the optical apparatus 2 and of a lighting device, which is not illustrated, of the objects to be acquired.

This control device can command activation of both the optical apparatus 2 and the illuminator at a preset frequency, thus acquiring images continuously or alternatively, it can command activation of the illuminator only when an object is identified by analysing the content of the image.

Alternatively, and preferably, a presence sensor 5 and an advancement sensor 6 (for example an encoder) are associated with the movable supporting surface 4 for communicating and commanding the optical apparatus 2 connected to these sensors, directly or via the control device, to acquire the images of the object 3 in transit and/or to activate the illuminator only in the presence of the object 3. These sensors identify when the object 2 enters inside an acquisition field or reading field of the optical apparatus 2 and when it exits this field and in this manner the sensors detect the presence of an object in a preset position along the movable supporting surface 4. It should be noted that this preset position is established in such a manner that the object 3, in this position, is inside the focusing range and the field of view of the optical apparatus.

The optical apparatus 2 can in fact be provided, as explained in greater detail below, with a distance-detecting device, which can be a height sensor, for example a light curtain, or a laser or ultrasonic distance measuring device, or in particular an automatic focusing device. The focusing interval thus corresponds to the acquisition field or reading field, whilst the field of view is the projection of the sensor of the optical apparatus 2 through the optical receiving means of the apparatus 2, i.e. the system of lenses, at the focusing distance.

The distance can be measured at the same time as the image is acquired or prior to the acquisition of the image.

The optical apparatus 2 can further comprise inclination-detecting means, which is not illustrated, for example an accelerometer or an inclinometer, which is able to supply the inclination of the optical apparatus 2, and thus of the optical axis of this apparatus 2, with respect to a Cartesian reference system X, Y and Z. In FIG. 1, the inclination with respect to the axis Z is the equivalent of the inclination with respect to gravity; in a more general case the inclination with respect to gravity will be a combination of the inclinations with respect to X, Y and Z.

It should be noted that the inclination-detecting means can be integrated into the optical apparatus 2 or be integrally associated therewith, inasmuch as it is arranged in a device that is separate but connected directly, or by the control device to the optical apparatus 2.

The optical apparatus 2 can further comprise storage means, not shown, for storing the inclination received from the inclination-detecting means.

The image acquisition system 1 further comprises a user interface graphic device 7 connected directly, or through the control device, to the optical apparatus 2 by means of which an operator is able to perform a configuration step of the acquisition system, preceding a work step, in order to validate a corresponding inclination between the optical axis of the apparatus 2 and a known reference plane associated with the object 3. In the work step, the acquired image is in fact processed in function of this corresponding inclination in order to correct a possible perspective distortion of the acquired image and to extract features of the object from the processed image. It is thus possible to correct the perspective distortion of the acquired image.

In the case of objects with a box-shaped body, the reference plane is the face of the object that has the coded information to be decoded. In the case of objects having a curved body, i.e. having a body provided with at least a curved external surface, the reference plane corresponds to a plane touching the curved surface. This reference plane can be orthogonal or inclined with respect to the supporting surface of the object.

The corresponding inclination is determined during this configuration step and the operator is able to obtain and validate the corresponding inclination, in a simple and intuitive manner and with a high degree of precision.

The corresponding inclination can be calculated from the inclination of the reference plane with respect to gravity and from the inclination of the optical axis V of the apparatus 2 with respect to gravity, as will be explained in greater detail below.

Figure 2:
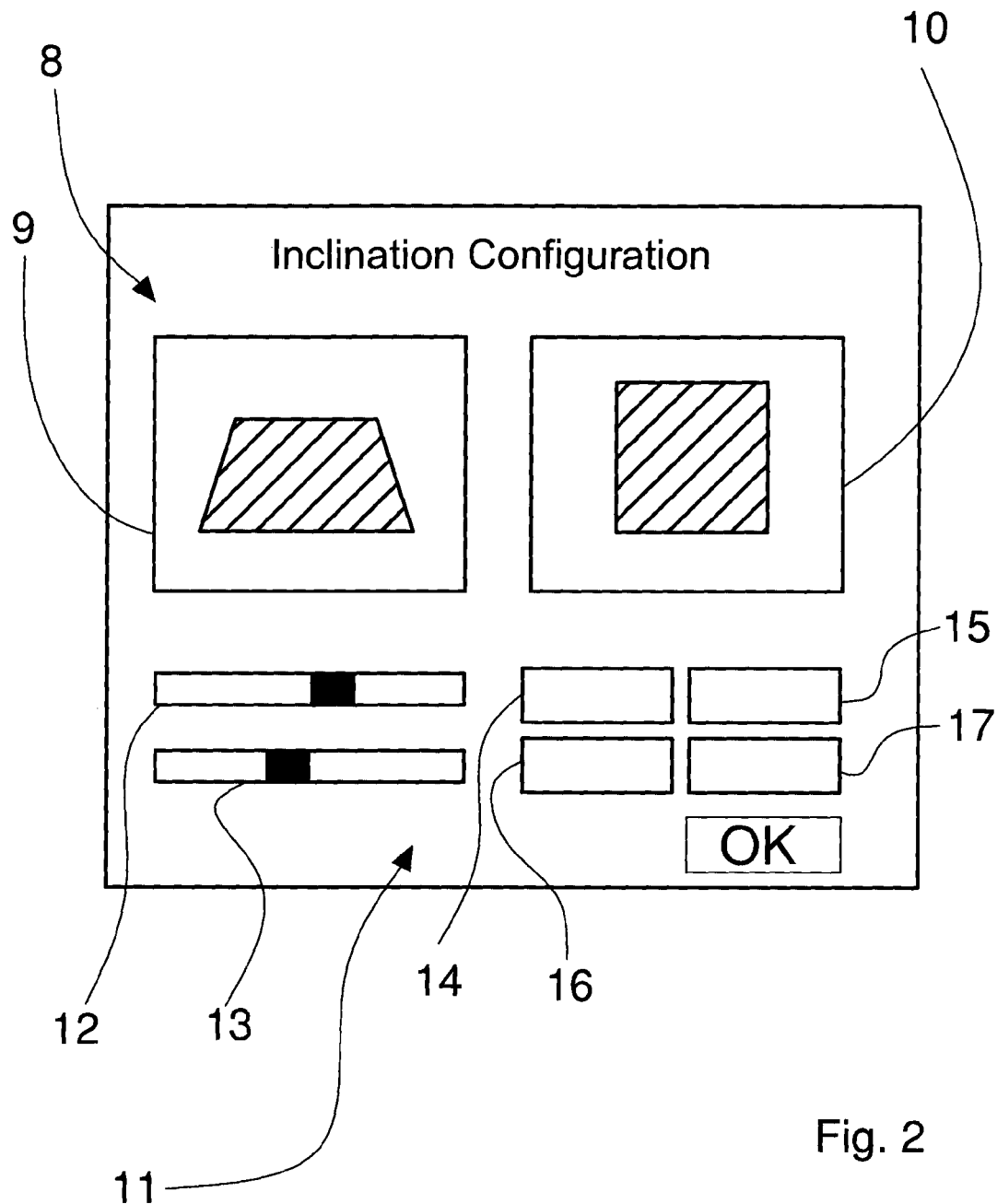
FIG. 2 illustrates schematically a display screen of a user interface graphic device forming part of the image acquisition system of FIG. 1.

As illustrated in FIG. 2, in the configuration step the user interface graphic device 7 shows an "inclination configuration" screen 8, which comprises a portion 9 in which the acquired image is displayed and a further portion 10, in which a further image is displayed, which derives from this acquired image and is processed in such a manner as to display a perspectively corrected image owing to a corresponding simulated inclination, which is set by the operator.

The screen 8 further comprises interacting means 11, comprising a first cursor 12, a second cursor 13, and selecting buttons 14, 15, 16, and 17 for managing the configuration screen 8 itself.

The first cursor 12 is connected directly to a corresponding simulated inclination value and modifying his cursor directly affects the perspectively corrected image deriving from this corresponding simulated inclination.

It should be pointed out that the expression "simulated" means that the perspectively corrected image is displayed in the further portion by a processing mode according to the corresponding inclination selected by an operator.

The second cursor 13 is connected directly to a simulated distance value between said optical apparatus 2 and said object 3 and a modification of the cursor 13 directly affects the perspectively corrected image, which is displayed close-up or at a distance by means of a zoom effect.

The OK button enables the user to validate the corresponding simulated inclination and/or the simulated distance as a respective inclination and/or distance.

The button 14 has the meaning "Reset" and returns the corresponding simulated inclination and the simulated distance to preset values.

The button 15 has the meaning "Image Acquisition", inasmuch as it commands the optical apparatus 2 to acquire a new image.

The button 16 has the meaning "Exit", and cancels everything done during configuration by returning to a different display screen.

The button 17 has the meaning "Advanced settings" and commands that a further screen be displayed for manual settings that is not illustrated and which can be an additional window on its own or an additional manually set up screen provided with fields for entering text and/or numeric values, by means of which the operator is allowed to insert manually a value of a corresponding simulated inclination or a simulated distance, for example by inserting simulated inclination values for the inclination of the reference plane and of the optical axis V of the optical apparatus 2.

If the object is a box-shaped body, as shown in FIG. 1, the upper face 3a of which is orthogonal to the side faces 3b and 3c that are orthogonal to one another and it is parallel to a lower face resting on the supporting surface 4, the inclination of the reference plane can be easily calculated if the inclination of the supporting surface 4 with respect to gravity is obtained.

If the optical apparatus 2 comprises the inclination-detecting means, for example an accelerometer or an inclinometer, the inclination of the optical apparatus 2 with respect to gravity is received by the inclination-detecting means and can be stored in the optical apparatus 2. This enables the optical apparatus 2 to be used in configuration step and before definitive fixing to the resting base to measure the inclination of the reference plane and/or of the supporting surface 4 of the object 3 with respect to gravity. In fact, by resting the optical apparatus 2 in the reference plane for the object, (a face of the object if the body is box-shaped or externally and touching the object if the external surface of the object is curved) and/or on the supporting surface 4 (and then calculating from this supporting surface 4 the inclination of the reference plane, orthogonal or parallel to the supporting surface 4), the inclination measured by the inclination-detecting means is stored as an inclination of the reference plane or of the supporting surface.

Alternatively, the inclination of the reference plane and/or of the supporting surface 4 is settable by the further screen for manual settings.

Similarly, alternatively or in addition, the inclination of the optical apparatus 2 is obtainable from the inclination configuration screen 8, or from the screen for manual settings or, as said previously, it is received from the inclination-detecting means.

If the inclination-detecting means is existing, in an initial step of the configuration step when the "inclination configuration" screen 8 is proposed to the operator, the further image can be displayed in the further portion 10 that is already processed by the perspective correction that depends on the corresponding inclination calculated by the inclination received from the inclination-detecting means.

Similarly, also the interacting means 11 can be viewed in a configuration based on this corresponding calculated inclination.

The operator, who has to validate the simulated inclination as a corresponding inclination in a final step of the configuration step to conclude the configuration, is facilitated inasmuch as the simulated inclination proposed for correcting the perspective distortion in the further portion 10 is already a calculated value based on actual inclination values.

Also, if the inclination-detecting means is present, the control device is able to check whether the optical apparatus 2, configured in a configuration step of the system illustrated above, has been unexpectedly moved during a work step thereof.

The control device and/or the optical apparatus 2 can in fact receive and store the inclination received in a configuration step to compare this inclination with the same inclination received in a work step. In other words, it is possible to monitor the inclination of the optical apparatus 2 to generate an alarm signal, intended for an operator, if the inclination of the optical apparatus 2 changes, perhaps because of an unwanted hit.

As said previously, the operator is able to validate by the OK button both the corresponding inclination and the distance of the optical apparatus 2 from the object, to correct a possible distortion of the acquired image due both to the corresponding inclination and to the distance.

The further image displayed in the further portion 10 is processed by a perspective correction that considers a simulated distance, set by the second cursor 13 of the interacting means 11. If the optical apparatus 2 comprises a distance-detecting device, as disclosed above and in particular an automatic focusing device that is able to detect the distance, the distance detected by the automatic focusing device is used in the initial step of the configuration step when the "inclination configuration" screen 8 is proposed to the operator, to correct perspectively the further image displayed in the further portion 10 and at the same time configure appropriately the cursor 13 of the interacting means 11.

In use, the image acquisition system performs an initial configuration step of the optical apparatus 2 and shows the operator the inclination configuration screen 8.

With the object the images of which are to be acquired, a reference plane is associated that is established in a known manner that depends on the productive application to be realized. Without restricting scope, we consider that images of a face of a box-shaped body arranged on a horizontal conveyor belt are to be acquired. If the optical apparatus 2 is associated with inclination-detecting means and with a distance-detecting device, the operator has to indicate beforehand the inclination of the supporting surface of the object, in order to be able to subsequently calculate therefrom and from the inclination obtained by the inclination-detecting means, the corresponding inclination between the reference plane and the optical axis V of the apparatus 2.

The operator, by looking at the initial configuration screen 8 of the user interface graphic device 7, can decide whether to press the OK button to validate immediately the corresponding simulated inclination and/or the simulated distance proposed in the initial configuration step as a respective corresponding inclination and/or distance, or whether to continue to modify the corresponding simulated inclination and/or the simulated distance inasmuch as the further image displayed has not been processed by an acceptable perspective correction.

It should be noted that the "configuration" screen 8 is advantageous even if the optical apparatus 2 does not comprise the inclination-detecting means. The operator can use the inclination cursors 12 and/or distance cursors 13 to simulate several different perspective corrections, immediately evaluating in the further portion 10 the result of the perspective correction and validating inclination and/or distance when satisfactory.

Th operator uses the "OK" button to perform the final step of the configuration step and then both the corresponding inclination and the distance are validated. It follows that, when the image acquisition system starts to operate in the work step, the images acquired by the optical apparatus 2 are processed to correct a possible perspective distortion and processing is performed as a function of the corresponding inclination, and/or of the distance validated by the operator in the configuration step. At least one feature of the object 3 is thus extracted from the processed image, such as, for example, a barcode impressed on or applied to a face of the object 3.

In this manner, it is possible to obtain a method of acquiring images of an object for an image acquisition system that enables accurate processing of the acquired images, and also a correction of the perspective distortion present, and at the same time enables an operator to configure the acquisition system very simply.

In order to correct the perspective distortion, the image is acquired and is processed by a processing mode that depends on a corresponding inclination between the optical axis V of the optical apparatus 2 of the acquisition system and a plane associated with the object. The operator has at his disposal a screen 8 of a user interface graphic device 7 for displaying not only the acquired image but also a processed perspectively corrected image and is thus able to validate this corresponding inclination only when the perspective correction deriving from this corresponding inclination is satisfactory in the judgement of the operator.

Great processing precision is thus ensured. As calibration pattern tests are not used to process the image, the process of configuring the image acquisition optical apparatus system is speeded up and facilitated.

The screen 8 for configuring the display device further draws particular advantage from having inclination-detecting means associated with the optical apparatus 2, inasmuch as in the initial configuration step the further image is already processed with an actual and non-simulated perspective correction.

Nevertheless, it should be pointed out that the presence of the inclination-detecting means is not necessary as the optical apparatus 2 is also configurable without the inclination-detecting means. In fact, validation of the corresponding inclination is achieved by proposing to the operator the simultaneous display of the perspectively distorted acquired image and of a further image derived from the acquired image and processed by means of a simulated inclination value. The operator has in this manner an immediate graphic view of the validity of the perspective correction implemented and can easily make the perspective correction more precise by modifying the interacting means 11 of the screen 8 of the user interface graphic device 7.

In a further embodiment, an embodiment of the image acquisition system 101 comprises, or is associated with an inclination-detecting means but the user interface graphic device 7 does not have to be present. In particular, one embodiment of the optical apparatus 102 includes inclination-detecting means, for example an accelerometer or an inclinometer, which are not illustrated, and has an optical axis V', which can, for example, coincide with or be parallel to the a, longitudinal axis of the optical apparatus 102 in such a manner that the inclination of the optical axis V' and the inclination of the optical apparatus 102 coincide. The embodiment 102 of the optical apparatus in practice differs from the optical apparatus 2 inasmuch as it includes inclination-detecting means in a non-optional manner. What has already been illustrated previously in relation to the optical apparatus 2 applies to the other features of the optical apparatus 102, like the control device for managing image acquisition. Similarly, what has been said before regarding defining the optical axis V' and defining the reference plane with respect to the object 3 remains valid.

In one configuration step of the optical apparatus 102, it is thus possible to obtain a corresponding inclination, between the reference plane associated with the object 3 and the optical axis V' of the apparatus 102, which is calculatable from the inclination of the optical apparatus 102 with respect to gravity received by the inclination-detecting means and from an inclination of the reference plane with respect to gravity, which is stored. This embodiment of the image acquisition system 101 is advantageously applicable, as will be indicated below, to an optical apparatus 102 that is fixed, i.e. integrally connected to a supporting base that remains in the same position over time but is particularly suitable if the optical apparatus 102 is movable, i.e. is integrally connected to a supporting base that is movable over time by successive movements between a plurality of different positions.

As illustrated in FIG. 3, the optical apparatus 102 can, for example, be associated with a robot arm 103 of the "pick and place" type mounted on a base 104, which can rotate 360°. To the base 104 the robot arm 103 is fixed that comprises a first end body 105, a second end body 107 and a third end body 108 defining an articulated arm in which the first body 105 is connected to the base 104 by the interposition of a first articulation 106a and in which the second body 107 and the third body 108 are connected to the first body 105 and together by a second articulation 106b and a third articulation 106c. Each articulation 106a, 106b and 106c has respective parallel rotation axes.

The third end body 108 carries gripping means 109 of the object 3 and to the latter the resting base, which is not illustrated, of the optical apparatus 102 is also fixed.

Said optical apparatus 102 is thus movable over time inasmuch as it is integral with the third body 108 of the robot arm 103 that moves in space and changes orientation continuously in particular. Without limiting scope, it is observed that the robot arm 103 can be of a different type from the one shown (for example each articulation can have rotation axes that are not parallel and/or multiple to one another) and/or that the supporting base to which the optical apparatus 102 is connected can be fixed in a different position in the robot arm 103.

As has already been said in relation to the preceding embodiment, the corresponding inclination between the reference plane associated with the object and the optical axis V' of the optical apparatus 102 is calculated by the inclination of the reference plane with respect to gravity and by the inclination of the optical apparatus 102 with respect to gravity. Nevertheless, an inclination of the reference plane with respect to gravity is used that has already been stored in the image acquisition system 101 and therefore the corresponding inclination is directly calculatable by the inclination of the optical apparatus 102.

It is observed that the inclination-detecting means, incorporated in the embodiment of the optical apparatus 102, is also able to detect a movement between two successive positions of the robot arm inasmuch as it is able to detect a variation in the acceleration of the inclination-detecting means and not only a static inclination value.

In use, if the optical apparatus 102 is movable, at the end of a movement between two subsequent positions a configuration step of the optical apparatus 102 is performed and the corresponding inclination is stored that is associated with the position reached by the optical apparatus 102, the inclination of the optical axis V' is then stored. If the optical apparatus 102 is fixed, on the other hand, the configuration step is run at least once before the work step to store the corresponding inclination.

The configuration step is then followed by the work step, in which an acquired image is processed in function of the corresponding inclination obtained in the configuration step and a possible distortion of the acquired image by the optical apparatus 102 is corrected that is due to non-optimal positioning between the object and the optical apparatus 102. It is pointed out that, in the case of a movable supporting base, acquisition of the image and/or of the images can precede or follow the configuration step, in the sense that it can also be performed during a movement, in the final step thereof between two successive positions when the movable supporting base is, for example, decelerating or at the end of the movement and before the configuration step, or after the configuration step and during the work step. The image and/or images must be acquired only before the processing step. Also in this case, it is possible to compare the inclination of the inclination-detecting means received and stored in a configuration step with the inclination received by the inclination-detecting means during the work step, which is periodically monitored. In this manner, an alarm signal is generated that is intended for an operator if the inclination received by the embodiment of the optical apparatus 102 changes, in a clearly undesired manner, with respect to the inclination received and stored during the configuration step. The movement of the robot arm could over time cause a variation in the fixing of the optical apparatus 102 to the supporting base, in the case of movements at high accelerations.

In this manner, by arranging an embodiment of the optical apparatus 102 in such a manner that it comprises inclination-detecting means and as image processing depends on the corresponding inclination between the optical axis V' of the apparatus 102 and a reference plane associated with an object, which is calculatable from the inclination received by the inclination-detecting means, it is possible to obtain a method of acquiring images that corrects the perspective distortion of the acquired image although no configuration of the system by an operator is necessary.

The image acquisition and configuration method of the embodiment of the optical apparatus 102 is thus totally automatic and is advantageous for an embodiment of the to image acquisition system 101 in which the user graphic interface device 7 is not present. If the embodiment of the optical apparatus 102, provided with inclination-detecting means, is integrally connected to a fixed supporting base the method is advantageous inasmuch as system configuration by an operator is not required.

This method is even more advantageous if the embodiment of the optical apparatus 102 is integrally connected to a movable supporting base. In this case, configurations takes place in particular substantially at the end of each movement of the embodiment of the movable optical apparatus 102, to store the corresponding inclination of the optical apparatus 102. By associating, after each movement of the supporting base, each position that is reachable by the supporting base with a respective corresponding inclination value, the correction of the perspective distortion is implementable in the work step in each position reached by the optical apparatus 102.

We have said that the image acquired by the optical apparatus 2 or 102 is processed to correct a possible perspective distortion of the acquired image, in such a manner that it is possible to extract from this processed image at least one feature of the object, in a correct manner and without errors due to the perspective distortion.

As said previously, in use, image processing depends on the corresponding inclination between a known reference plane associated with the object and the optical axis of the optical apparatus 2 or 102.

This corresponding inclination is clearly given in a Cartesian reference system X, Y and Z, i.e. the inclination can have angular components in or more of the three Cartesian axes and the perspective distortion depends on the corresponding inclination in the three Cartesian axes X, Y or Z.

Nevertheless, it is supposed that the perspective correction is implemented in at least one of the three Cartesian axes.

What has been said is valid both for an image acquisition system 1 comprising an optical apparatus 2 connected to a fixed supporting base and a user interface graphic device 7 that enables this corresponding inclination to be configured precisely, and for a further embodiment of the image acquisition system 101, in which a further embodiment of the optical apparatus 102 comprises inclination-detecting means and the step of configuring and identifying the corresponding inclination is total automatic and is obtainable by the inclination received from this inclination means. It is in fact the optical apparatus 2 or 102 that acquires and processes an acquired image.

Processing the image depends on the corresponding inclination inasmuch as it comprises identifying a preset processing mode according to the corresponding inclination and applying this preset processing mode to correcting the possible perspective distortion. Nevertheless, it should be noted that it is possible to set a minimum threshold value of corresponding inclination, such that for this processing mode it is ascertained only whether the corresponding inclination is greater than or the same as this minimum threshold value. This is because if the corresponding inclination has a very small value, no perspective correction of the acquired image is necessary and features of the object can be extracted from the acquired image and not be processed without danger of distortions or errors, to the advantage of processing speed.

If, on the other hand, the corresponding inclination is greater than or the same as this minimum threshold value, a set processing mode is selected from between a plurality of different processing modes and with each processing mode a different geometrical transformation is associated.

Several geometrical transformations are in fact possible, for example a projective homography, an affine homography, a similarity or a euclidean transformation that take account of 2D perspective distortions of varying degree and which are respectively associable with corresponding inclinations of respectively greater or lesser value. For example, projective homography considers a distortion due to a corresponding raised inclination that is able to modify a geometric figure such as a square, if viewed frontally, into an elongated trapezium or an asymmetrical quadrilateral, in the presence of perspective distortion.

On the other hand, a euclidean transformation considers only a distortion that is due to rotation that is applicable for a corresponding inclination of low value that occurs when the optical apparatus is almost orthogonal but rotated with respect to the object to be acquired.

Each geometrical transformation associated with a processing mode is given as an algorithm stored a priori in the optical apparatus 2 or 102 and is therefore the choice between a perspective transformation or another and depends on the corresponding inclination between the optical axis of the apparatus 2 or 102 and a reference plane of the object 3.

Precisely for selecting the preset processing mode, with each processing mode a respective processing threshold value is associated. A plurality of threshold intervals are thus defined that are contiguous to one another and have lower end values that are the same as the processing threshold values, each value associated with a respective processing mode. By means of the comparison of the corresponding inclination with this plurality of processing threshold values, it is possible to select the preset processing mode.

In other words, a set threshold interval is identified to which a set processing mode corresponds, if the corresponding inclination falls within this interval.

In the case of an inclination with components on several Cartesian axes X, Y, Z, it is generally a question of associating the processing mode with a threshold value expressed by respective threshold value components, each associated with a respective Cartesian axis, or by threshold values transitions, which nevertheless take into consideration the inclination in the Cartesian axes X, Y or Z.

It should be noted that this geometrical transformation is applicable entirely to the acquired image to correct this image entirely, so as to extract from this entire image the feature of interest of the object.

In a different embodiment of this method, a zone of the acquired image in which a region of interest is located is preliminarily recognised and the geometrical transformation is applied only to this zone inasmuch as the feature of the object to be extracted is found perspectively in this corrected zone. This speeds up processing as the geometrical transformation is applied only where it is necessary.

Also, in a further embodiment this method, a first part of the acquired image is recognised in which a first region of interest is located. From this first region of interest, suitably processed, a localization reference is derived that is transformed geometrically by the identified processing mode in order to correct the possible perspective distortion present in this localization reference. In this manner, the localization reference is able to localize without error a second part of the acquired image in which a second region of interest is located.

The geometrical transformation can thus be applied to this second part to perform a perspective correction only of his second part as the feature of the object is in this second part. Alternatively, it is also possible to extract a deformed feature from this second part and to apply a perspective correction to this deformed feature on the basis of said corresponding inclination to obtain a perspectively correct feature.

As said previously, it is necessary to obtain respectively the inclination of the reference plane and of the optical axis V of the apparatus 2 or 102 with respect to gravity in order to be able to calculate this corresponding inclination.

The corresponding inclination is calculated as the difference between the inclination of the optical axis V of the apparatus 2 or 102, and the inclination of the reference plane, normally 0° or 90° with respect to gravity if we consider, for example, the box-shaped body 3 shown in FIG. 1.

As disclosed below, 0° or 90° is selected according to the inclination of the optical axis V with respect to a respective threshold value, for example 45°.

In this regard, the preceding remarks apply both to the image acquisition system 1 consisting of an optical apparatus 2 connected to a fixed supporting base and user interface graphic device 7 and to the further embodiment of the image acquisition system 101, in a further embodiment of the optical apparatus 102 that is connected to a movable supporting base and is provided with the inclination-detecting means to identify the corresponding inclination totally automatically.

In particular, the inclination of the reference plane can be obtained from the inclination of the face of interest and/or from the inclination of the supporting surface 4 if the object 3 is a box-shaped body, owing to a value set manually by an operator in a screen 8 of a user interface graphic device 7 or owing to the receipt of this inclination detecting means associated with or incorporated in the optical apparatus 2 and rested by an operator on this reference plane and/or this supporting surface 4.

The inclination of the optical axis V of the optical apparatus 2 is obtainable owing to a value set up manually by an operator in a screen 8 of a user interface graphic device 7 or owing to a value received from inclination detecting means associated with or incorporated in the optical apparatus 2 or 102.

The optical apparatus 2 of FIG. 1 has an inclination of the optical axis V given by only the angle α between the optical axis V of the optical apparatus 2 and the axis Z. As the object 3 is a box-shaped body with faces that are orthogonal to one another and the supporting surface 4 is horizontal, it is possible to activate the geometrical transformation identified by angle α, to acquire images of the frontal face 3b of the object, if this angle α is less than a corresponding preset threshold value, for example 45°. The optical apparatus 2 is not very inclined because the coded information to be extracted is affixed to the frontal face 3b of the object 3. For example, the geometrical transformation can be a homography algorithm developed specifically for a frontal face 3b, which has the angle α as an activation parameter.

On the other hand, if the angle α is greater than or the same as the corresponding set threshold value, for example 45°, the optical apparatus 2 is positioned to acquire images of the upper face 3a of the object 3. Similarly to what has been said for the geometrical transformation that is applicable to images of a frontal face 3b, it can be possible to identify the geometrical transformation associated with the angle α, by activating a homography algorithm developed specifically for an upper face 3a, which has as an activation parameter the angle β, which is complementary to the angle α.

As already said, by further monitoring the inclination of the optical axis of the optical apparatus 2 or 102 in the work step and comparing the inclination received with the corresponding inclination stored during the configuration step, it is possible to identify anomalous positioning conditions of the optical apparatus 2 or 102, which are due, for example, to undesired hits.

It should be observed that the possible perspective distortion of the acquired image, which is due to the corresponding inclination, can also be influenced by the distance of the optical apparatus from the object.

According to a further embodiment of the method of the present invention, the processing mode and the corresponding geometrical transformation is identified as a function of the inclination but applied to the acquired image according to both the corresponding inclination and the distance. This enables the perspective correction of the processed image to be improved further by also correcting possible zoom errors.

As already said in previously, the distance can be obtained both by a distance-detecting device and by manual setting by an operator.

It is observed that also extracting a feature from an image can depend on this corresponding inclination. In fact, as for extracting a feature from an image a reference model is usually used with which the image is compared, this model can be varied according to this corresponding inclination, associating, for example, a respective reference model with each perspective transformation.

Further, if an image recognition algorithm has to be applied to extract this feature from an image, a preset image recognition algorithm is selected from a plurality of different possible image recognition algorithms according to this corresponding inclination.

For example, each algorithm can be associated with a respective threshold value and the preset algorithm can be selected from the plurality of algorithms in a similar manner to what has been said for identifying the geometrical transformation as a function of the inclination.

For example, a first image recognition algorithm that is very fast but is not very tolerant to the perspective distortion could be selected to extract features from an object if the corresponding inclination has a low value, the optical apparatus is arranged almost opposite the object and we are therefore in the presence of a slight distortion.

A second image recognition algorithm, which is more complex than the former and thus slower but also more tolerant to the perspective distortion, could on the other hand be selected when the corresponding inclination is great, as it is able to recognise coded information even with very distorted images.

For example, the first image recognition algorithm could use a single reference model that is not distorted to make as an image recognition algorithm a single comparison between the acquired and/or perspectively corrected image and this reference model, to be very fast in processing whilst not tolerating distortions of the reference model. The second image recognition algorithm could on the other hand use multiple reference models, which are more or less distorted in relation to the non distorted reference model, and perform as an image recognition algorithm several attempts to compare the acquired and/or perspectively corrected image and this reference model to extract with greater precision features of interest from the acquired images.

In this manner, it is possible to obtain a method of acquiring images which, by enabling a set image processing mode to be selected, according to the corresponding inclination, from the optical apparatus and a plane associated with an object, enables the perspective distortion of the acquired image to be corrected in the most suitable manner.

Further, the method according to the invention associates with each processing mode a respective geometrical transformation algorithm and a respective threshold value and enables the most suitable set geometrical transformation to be selected.

Nevertheless, the geometrical transformation is not always identified and selected but only if the corresponding inclination has a value that is greater than or the same as a minimum threshold value. In fact, if the optical axis of the apparatus is arranged almost opposite the object the perspective distortion is not present in the acquired image and image processing cannot be speeded up.

Further, as also the image recognition algorithm depends on this corresponding inclination, extracting the features from the object 3 is specific for the identified perspective distortion and the speed of execution of the method is improved and at the same time decoding errors are minimised.

What is claimed is:

1. A method of acquiring images of an object arranged on a supporting surface comprising:
   providing at least an optical image acquisition apparatus of said object having an optical axis;
   in a work step of said optical image acquisition apparatus processing an acquired image for correcting a possible perspective distortion of said image;
   extracting from said processed image at least a feature of said object;
   associating a known reference plane with said object and in a configuration step of said optical image acquisition apparatus preceding said work step, obtaining a relative inclination between said reference plane and said optical axis;
   said processing comprising identifying a preset processing mode as a function of said relative inclination and applying said preset processing mode for correcting said possible perspective distortion,
   wherein said obtaining a relative inclination comprises obtaining a respective inclination of said reference plane with respect to gravity and of said optical axis with respect to gravity and calculating said relative inclination from said respective inclinations,
   wherein said object is a box shaped body, provided with an upper face and side faces that are orthogonal to one another, said reference plane relative to a face of said box shaped body,
   wherein said identifying a preset processing mode comprises selecting a processing mode from a plurality of different processing modes and associating a different geometrical transformation with each processing mode, and
   wherein said supporting surface is horizontal, said relative inclination corresponds to said inclination of said optical axis with respect to gravity and in a Cartesian reference system said inclination is defined only by a preset angle between said optical axis and a vertical axis, and comprising applying a geometrical transformation relative to said preset angle for acquiring images of a lateral front face of the object, if said preset angle is less than a respective threshold value, in particular 45°.

2. The method according to claim 1, and comprising comparing said relative inclination with a minimum threshold level, and wherein said identifying said processing mode is performed if said relative inclination is greater than or the same as said minimum threshold level.

3. The method according to claim 1, wherein said identifying a preset processing mode comprises selecting a processing mode from a plurality of different processing modes and associating a different geometrical transformation with each processing mode.

4. The method according to claim 3, and comprising associating with each processing mode a respective processing threshold value and comparing said relative inclination with said respective processing threshold values for identifying said preset processing mode.

5. The method according to claim 3, and comprising applying said geometrical transformation entirely to said acquired image to correct said acquired image and extract said feature from said entire image corrected perspectively.

6. The method according to claim 3, and comprising recognising a zone of said acquired image wherein a region of interest is located, applying said geometrical transformation to said zone for perspectively correcting said zone and wherein said method comprises extracting said feature from said zone corrected perspectively.

7. The method according to claim 3, and comprising recognising a first part of said acquired image wherein a first region of interest is located, deriving from said first region of interest a localization reference, applying said geometrical transformation to said localization reference for localizing by said localization reference a second part of said acquired image, wherein a second region of interest is located.

8. The method according to claim 7, and comprising applying said geometrical transformation to said second part to correct perspectively said second part and wherein said method comprises extracting said feature from said second part corrected perspectively.

9. The method according to claim 7, and comprising extracting a deformed feature from said second part and correcting said deformed feature on the basis of said relative inclination to obtain a feature corrected perspectively.

10. The method according to claim 1, and wherein said obtaining said inclination of said reference plane comprises obtaining an inclination value of said face of interest and/or of said supporting surface by a manual set up in a screen of a graphical user interface device, or obtaining a value received from inclination detecting means associated in an integral or incorporated manner with said optical image acquisition apparatus, when said optical image acquisition apparatus is rested by an operator on such a reference plane and/or such a supporting surface.

11. The method according to claim 1, wherein said obtaining said inclination of said optical axis comprises obtaining a value manually set up in a screen of a graphical user interface device or obtaining a value received by inclination detecting means, associated in an integral or incorporated manner with said optical image acquisition apparatus.

12. The method according to claim 1, wherein said optical apparatus image acquisition apparatus incorporates, or is associated with, inclination detecting means, and wherein said method comprises monitoring in said work step said inclination of said optical axis received from said inclination detecting means and generating an alarm signal intended for an operator if said inclination of said optical image acquisition apparatus changes with respect to said inclination received and stored during said configuration step.

13. The method according to claim 1, and comprising obtaining a distance of said optical image acquisition apparatus from said object to correct a possible distortion of said acquired image due to said relative inclination and to said distance.

14. The method according to claim 13, and comprising identifying said processing mode as a function of said relative inclination and applying said relative geometrical transformation as a function of both said relative inclination and of said distance.

15. The method according to claim 1, wherein said extracting said feature from said image comprises comparing said image and/or a part of said image with a reference model, and varying said reference model as a function of said relative inclination.

16. The method according to claim 1, and wherein said extracting said feature from said image comprises selecting a preset image recognition algorithm from a plurality of image recognition algorithms as a function of said relative inclination and associating with each image recognition algorithm a preset respective threshold value, comparing said relative inclination with said preset respective threshold values to select said preset image recognition algorithm.

17. The method according to claim 1, wherein said relative inclination is given in a Cartesian reference system X, Y and Z and said correcting comprises correcting said possible distortion in at least one of the three Cartesian axes.

18. A method of acquiring images of an object arranged on a supporting surface comprising:
   providing at least an optical image acquisition apparatus of said object having an optical axis;
   in a work step of said optical image acquisition apparatus processing an acquired image for correcting a possible perspective distortion of said image;
   extracting from said processed image at least a feature of said object;
   associating a known reference plane with said object and in a configuration step of said optical image acquisition apparatus preceding said work step, obtaining a relative inclination between said reference plane and said optical axis;
   said processing comprising identifying a preset processing mode as a function of said relative inclination and applying said preset processing mode for correcting said possible perspective distortion,
   wherein said obtaining a relative inclination comprises obtaining a respective inclination of said reference plane with respect to gravity and of said optical axis with respect to gravity and calculating said relative inclination from said respective inclinations,
   wherein said object is a box shaped body, provided with an upper face and side faces that are orthogonal to one another, said reference plane relative to a face of said box shaped body,
   wherein said identifying a preset processing mode comprises selecting a processing mode from a plurality of different processing modes and associating a different geometrical transformation with each processing mode, and
   wherein said supporting surface is horizontal, said relative inclination is obtained from said inclination of said optical axis with respect to gravity and in a Cartesian reference system said inclination is exclusively defined by a preset angle between said optical axis and a vertical axis, and comprising considering the complementary angle to said preset angle and applying a geometrical transformation relative to said complementary angle for acquiring images of said upper face, if said preset angle is greater than or the same as a respective threshold value, in particular 45°.

* * * * *